United States Patent [19]

Fedeli et al.

[11] Patent Number: 5,224,260
[45] Date of Patent: Jul. 6, 1993

[54] METHOD FOR EMBODYING A MAGNETIC HEAD WITH TWO MAGNETIC MATERIALS

[75] Inventors: Jean-Marc Fedeli, Beaucroissant; Henri Sibuet, Le Fontanil, both of France

[73] Assignee: Commissariat a l'Energie Atomique, Paris, France

[21] Appl. No.: 652,985

[22] Filed: Feb. 8, 1991

[30] Foreign Application Priority Data

Feb. 21, 1990 [FR] France .................. 90 02114

[51] Int. Cl.⁵ .................................. G11B 5/42
[52] U.S. Cl. ........................ 29/603; 360/127; 427/130; 427/131
[58] Field of Search .............. 29/603; 360/122, 125, 360/127; 427/128–132

[56] References Cited

U.S. PATENT DOCUMENTS

| | | | |
|---|---|---|---|
| 3,224,074 | 12/1965 | Peters | 29/603 |
| 3,566,045 | 2/1971 | Paine | 29/603 X |
| 4,949,207 | 8/1990 | Lazzari | 29/603 X |

Primary Examiner—Carl E. Hall
Attorney, Agent, or Firm—Oblon, Spivak, McClelland, Maier & Neustadt

[57] ABSTRACT

A method for forming a magnetic head with two magnetic materials and magnetic heads obtained by this method. According to the present invention, a first magnetic material (72, 74) with slight hardness is electrolytically deposited and a second magnetic material (82, 84) with increased hardness is deposited by any other means, especially by cathodic evaporation. Magnetic heads produced by such a method find application for the reading and storage of information of magnetic media such as disks, tapes, etc.

10 Claims, 3 Drawing Sheets

METHOD FOR EMBODYING A MAGNETIC HEAD WITH TWO MAGNETIC MATERIALS

FIELD OF THE INVENTION

The object of the present invention is to provide a method for forming a magnetic head with two magnetic materials and a head obtained via this method.

BACKGROUND OF THE INVENTION

The invention is applicable to the embodiment of two types of magnetic heads, namely flying heads for disk storage systems, or contact heads for tape storage systems.

The document relating to the U.S. Pat. No. 4,949,207 describes a method for embodying a thin-filmed and magnetic head with a planar structure. The head obtained by means of this method is shown in a cutaway view on the accompanying FIG. 1. It includes a substrate 10 in which a first caisson has been filled up by a first magnetic film 16 obtained via electrolytic growth on an electrode 14, a winding 20 embedded in a nonconducting film 18, two magnetic blocks 23, 24, a second magnetic film forming two flux concentrators 30, 31, a central nonconducting islet 32, a nonconducting film 34, such as a silica film, defining another caisson which has been filled up with another magnetic film, also formed by electrolytic growth, this film being separated into two portions 46, 48 by a non-magnetic spacer 42 constituting the gap of the head.

A similar head may be obtained by suppressing the flux concentrators 30 and 31 and by ensuring that the upper film 46, 48 takes support directly on the blocks 23, 24.

In the remainder of this document, the magnetic portion disposed on both sides of the spacer 42 shall be denoted by the term the "upper polar piece", the lower polar piece being the one corresponding to the magnetic film 16.

In this prior technique, the upper polar piece is thus obtained by electrolytic depositing. A magnetic material suitable for this technique may be an iron-nickel alloy, namely a soft material, with a composition of 80/20.

Although providing satisfaction in certain respects, this technique does exhibit a certain number of drawbacks. In fact, the choice of a magnetic material able to be electrolytically deposited is relatively limited, and the iron-nickel alloy is in the last analysis one of the rare materials which is suitable. Now, this material does not offer all the qualities required, especially as it exhibits a relatively slight mechanical hardness (Vicker's hardness of about 100). This weakness virtually renders this technique unable to produce contact heads owing to the rapid wear which accordingly would occur in such contact heads. In addition, the magnetic materials conventionally used and which are able to be electrolyzed do not exhibit optimal magnetic characteristics (saturated magnetization, magnetic permeability, etc).

Of course, there are other magnetic materials presenting better hardness and/or magnetic characteristics, but these materials are not suitable for electrolytic deposition and need to be treated by cathodic evaporation, for example. However, in this case, it is extremely difficult to obtain a homogeneous and particularly thick magnetic film on both sides of the gap, this being the case with the electrolytic technique.

SUMMARY OF THE INVENTION

The object of the present invention is to overcome these drawbacks. To this end, the present invention makes use of a method which combines the advantages of soft magnetic materials suitable for being electrolytically deposited and providing good homogeneity, especially close to the gap, and the advantages of other materials to be deposited by any other means, especially by cathodic evaporation, and which makes it possible to obtain optimal mechanical and/or magnetic properties.

More specifically, the object of the present invention is to provide a method for embodying a thin-filmed magnetic head and including the forming of an upper polar piece by electrolytic depositing in a caisson engraved in a nonconducting film, and a film of a first magnetic material on both sides of a non-magnetic spacer. The method being characterized by the fact that this electrolytic deposit does not fill up the entire caisson and that this caisson is then filled up by depositing a second magnetic material with magnetic and/or mechanical properties better than those of the first magnetic material, this second deposit not being electrolytic.

According to a first embodiment corresponding to flying heads intended for disk storage systems, in order to obtain the upper polar piece:

the first magnetic material is electrolytically deposited at the bottom of the caisson on one portion of the height of the caisson, the second magnetic material is deposited on the assembly, the surface of the assembly is polished until the non-magnetic spacer is freed.

According to a second embodiment corresponding to contact heads intended for tape storage systems, in order to obtain the upper polar piece in the caisson:

the first magnetic material is deposited against the non-magnetic spacer, the surface of the assembly is polished until the non-magnetic spacer is freed.

In these two embodiments, it is preferable that the second magnetic material is deposited by cathodic evaporation.

The object of the present invention is also to provide a magnetic heads obtained by the methods defined above. These heads include an upper polar piece disposed in a caisson engraved in a non-conducting film on both sides of a non-magnetic spacer, this polar piece including a first portion made of a first magnetic material deposited by electrolysis in the caisson but not completely filling up the caisson, and a second portion made of a second magnetic material having better magnetic and/or mechanical characteristics than the first magnetic material, this second portion filling up the remainder of the caisson.

In a first embodiment corresponding to the flying heads intended for disk storage systems, the first magnetic material occupies the bottom of the caisson and the second magnetic material the top part of the caisson.

In a second embodiment corresponding to the contact heads intended for tape storage systems, the first magnetic material is disposed against and on both sides of the spacer and the second magnetic material occupies the rest of the caisson.

The first magnetic material ought preferably to occupy a width of about 1 to several micrometers on both sides of the non-magnetic spacer.

Again, it is preferably that the first magnetic material is an iron-nickel alloy.

It is also preferable that the second material is selected from the group formed of the following alloys: nickel/molybdene/iron, iron/aluminum, iron/silicon/aluminium, cobalt/iron/silicon/boron, cobalt/zirconium/niobium and cobalt/zirconium.

BRIEF DESCRIPTION OF THE DRAWINGS

The characteristics and advantages of the invention shall appear more readily from a reading of the following description. This description relates to embodiment examples, given by way of explanation and being in no way restrictive, with reference to the accompanying drawings on which.

DETAILED DESCRIPTION OF THE DRAWINGS

Figure 1:
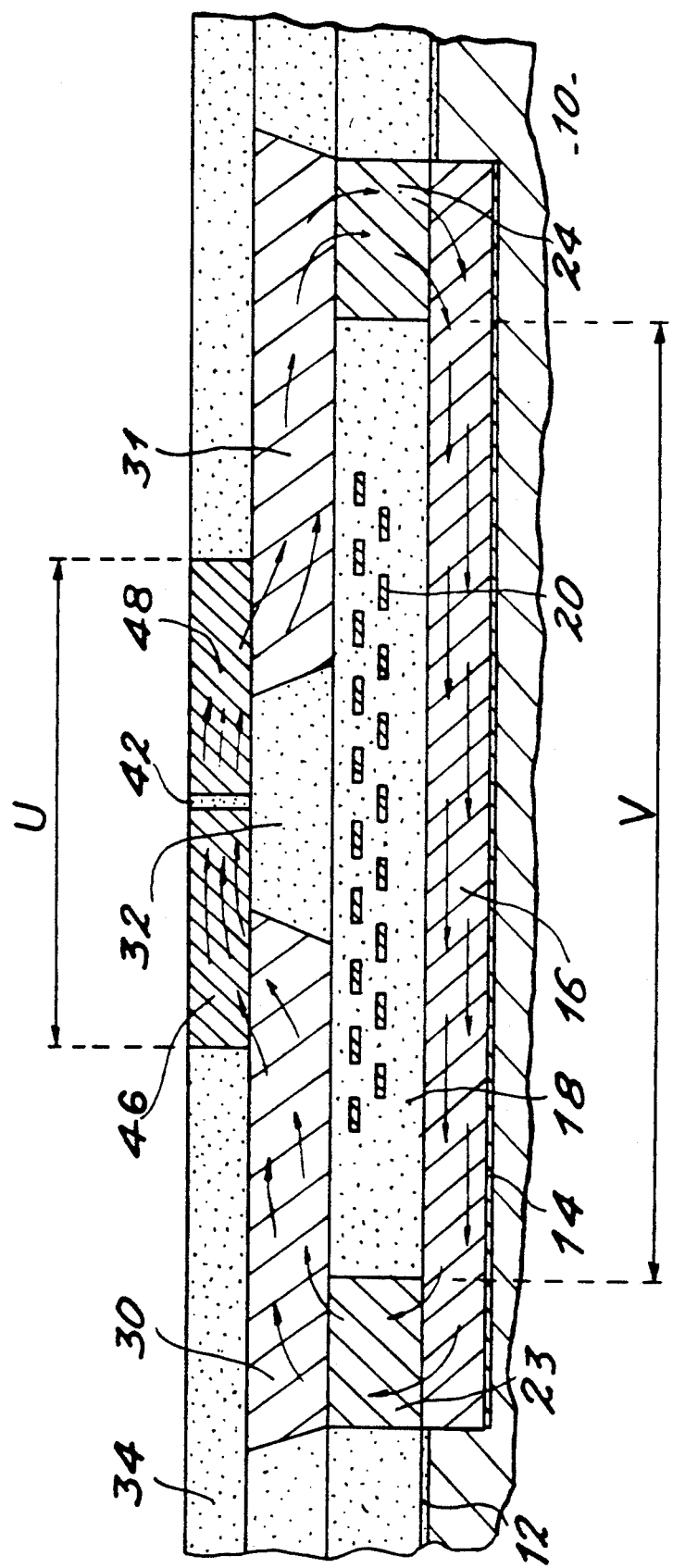
FIG. 1, already described, shows a cutaway view of a magnetic head according to the prior art.
Figure 2A:
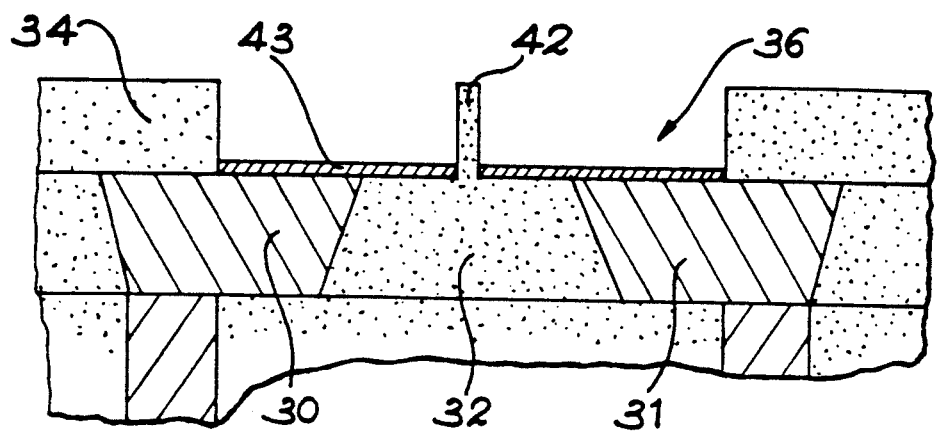
FIGS. 2a-2d illustrate various stages of the method of the invention in one first embodiment.
Figure 2B:
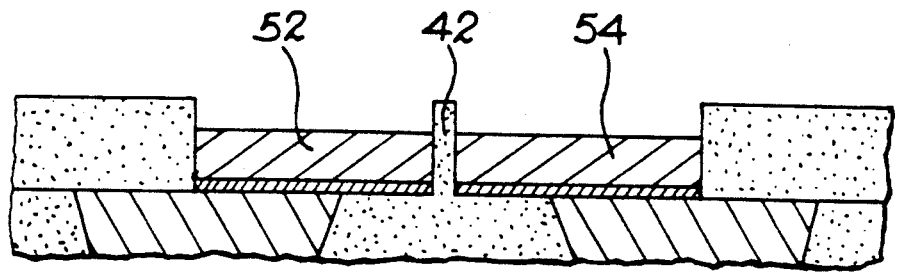
Figure 2C:
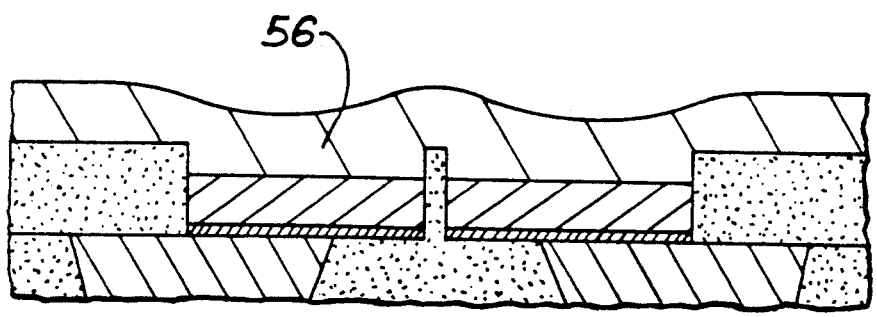
Figure 2D:
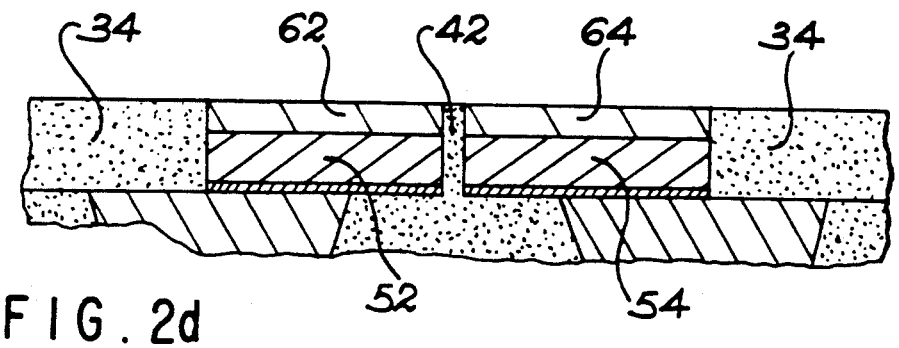

At section a, FIG. 2 shows an intermediate stage of the production method described in the document U.S. Pat. No. 4,949,207 mentioned earlier and more particularly the stage shown by section 1, FIG. 5 of this document. In this stage, the head includes at its upper portion a caisson engraved in the nonconducting layer 34 with a non-magnetic spacer 42; a metallic film 43 has been deposited at the bottom of the caisson so as to be used as an electrode during the next electrolytic depositing stage.

Section b of FIG. 2 shows that the growth of the first magnetic material by means of electrolysis is interrupted before the magnetic film 52, 54 has filled up the caisson. For a caisson 5 micrometers deep, for example, a magnetic film 52, 54 shall be formed with a thickness of about 4 micrometers, thus leaving an empty space of 1 micrometer.

A film 56 of the second magnetic material is then deposited on the assembly by any means, other than electrolytic means, and in particular by means of cathodic evaporation.

Finally, the upper face of the head is mechanically polished until the top of the non-magnetic spacer 42 (section d) is reached, which then leaves the film 62, 64 in the upper section of the caisson. The thickness of this film may be about one micrometer.

The magnetic properties of such a head are those of the film 62, 64 of the second material and shall be much better than those of the film 52, 54 deposited electrolytically without the quality of the deposits of these materials being diminished.

Figure 3A:
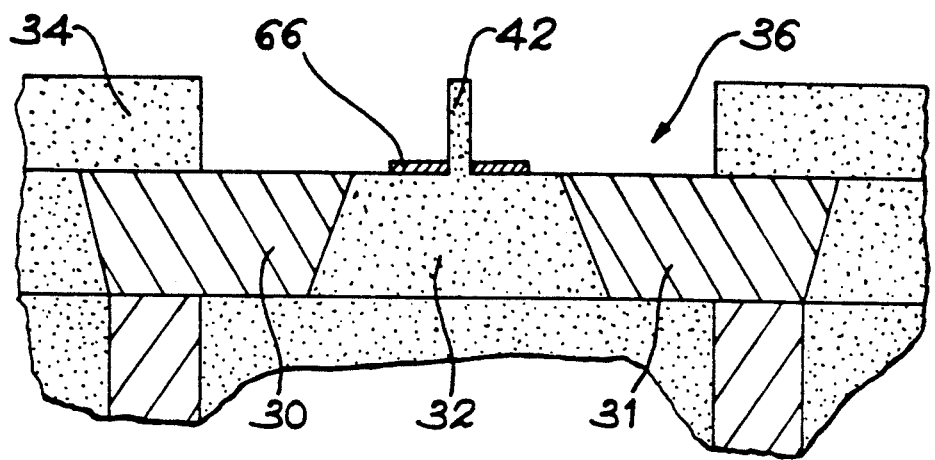
FIGS. 3a-3d illustrate various stages of the method of the invention in a second embodiment.
Figure 3B:
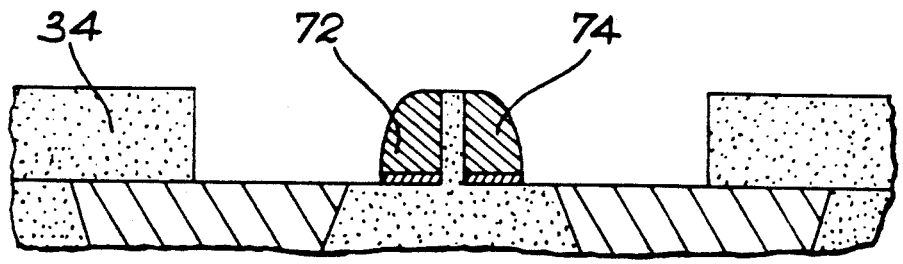
Figure 3C:
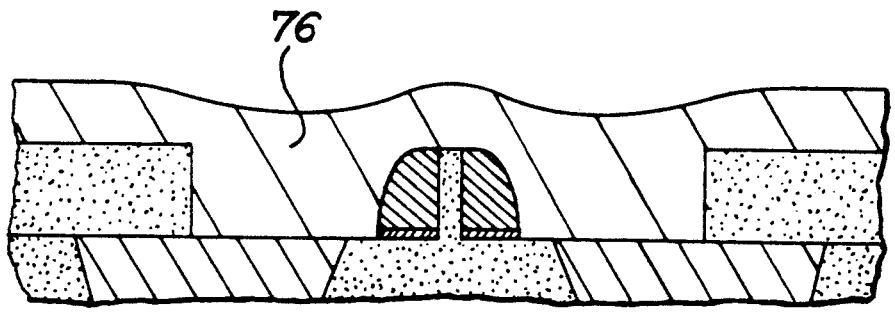
Figure 3D:
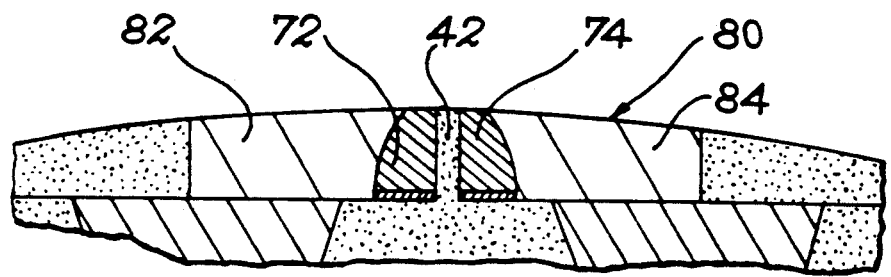

FIG. 3 illustrates the second embodiment of the invention and corresponding to contact heads.

The original structure (section a) roughly corresponds to the structure of FIG. 2, section a, if only the conductive film 66 for forming the electrode required for the following electrolytic depositing does not fully occupy the bottom of the caisson 36 but merely one narrow section situated at the foot of the non-magnetic spacer 42. The width of this electrode may be 2 micrometers. Then, on each side and against the spacer, the first magnetic material is grown electrolytically so as to form two magnetic pieces 72, 74 (section b). These pieces are approximately as high as the spacer but only occupy one small section of the caisson.

Then the second magnetic material 76 (section c) is deposited on the assembly by any non-electrolytic means, such as cathodic evaporation.

Finally, the upper section of the head (section d) is polished mechanically so as to embody a quarter circle 80 until the top of the spacer 42 is reached. The second magnetic material then now has two sections 82, 84. These sections with a Vickers' hardness of several hundreds shall protect the sections 72, 74 made of a softer material (Vickers' hardness of about 100) and shall thus limit the wear of the head in the gap zone.

What is claimed is:

1. A method of making a thin film magnetic head, comprising the steps of:
    forming a lower magnetic film on a substrate;
    forming an electric coil above the lower magnetic film;
    forming two magnetic contact pads having good magnetic continuity with said lower magnetic film on both sides of said electric coil;
    depositing a non-conducting film over the two magnetic contact pads;
    etching said non-conducting film to said magnetic pads so as to form a caisson with a predetermined height;
    forming a thin non-magnetic spacer in a middle of said caisson;
    depositing a conductive film in said caisson and etching said conductive film so as to leave it at a bottom of said caisson, on both sides of said non-magnetic spacer;
    electrolytically depositing in said caisson, taking said conductive film as an electrode, a first magnetic material having first hardness properties, said electrolytically depositing filling up only a portion of the predetermined height of said caisson;
    filling up the remainder of the predetermined height of said caisson with a second magnetic material having second hardness properties higher than said first hardness properties of said first magnetic material.

2. The method according to claim 1, wherein the step of filling up the remainder of the predetermined height of said caisson with the second magnetic material comprises the steps of:
    depositing said second magnetic material; and
    polishing the resulting assembly flush to said non-magnetic spacer.

3. A method of making a thin film magnetic head, comprising the steps of:
    forming a lower magnetic film on a substrate;
    forming an electric coil above the lower magnetic film;
    forming two magnetic contact pads having good magnetic continuity with said lower magnetic film on both sides of said electric coil;
    depositing a non-conducting film over the two magnetic contact pads;
    etching said non-conducting film to said magnetic pads so as to form a caisson with a predetermined height;
    forming a thin non-magnetic spacer in a middle of said caisson;
    depositing a conductive film in said caisson;

etching said conductive film so as to leave it at a bottom of said caisson only on one narrow section situated at a base of said non-magnetic spacer;

electrolytically depositing in said caisson, taking said conductive film as an electrode, a first magnetic material on both sides of said non-magnetic spacer, said first magnetic material having first hardness properties;

filling up the remainder of said predetermined height of said caisson with a second magnetic material having second hardness properties higher than said first hardness properties of said first magnetic material.

4. The method according to claim 3, wherein the step of filling up the remainder of said caisson with a second magnetic material comprises the steps of:

depositing said second magnetic material;

polishing the resulting assembly flush to said non-magnetic spacer.

5. The method according to any one of claims 1 to 4 wherein said second magnetic material is deposited by means of cathodic evaporation.

6. The method according to any one of claims 1 to 4, wherein said first magnetic material is an iron-nickel alloy.

7. The method according to any one of claims 1 to 4, wherein said second magnetic material is selected from the group consisting of: nickel-molybdene-iron, iron-aluminum, iron-silicon-aluminum, cobalt-iron-silicon-boron, cobalt-zirconium-niobium, and cobalt-zirconium.

8. The method according to claim 5, wherein said first magnetic material is an iron-nickel alloy.

9. The method according to claim 5, wherein said second magnetic material is selected from the group consisting of: nickel-molybdene-iron, iron-aluminum, iron-silicon-aluminum, cobalt-iron-silicon-boron, cobalt-zirconium-niobium, and cobalt-zirconium.

10. The method according to claim 6, wherein said second magnetic material is selected from the group consisting of: nickel-molybdene-iron, iron-aluminum, iron-silicon-aluminum, cobalt-iron-silicon-boron, cobalt-zirconium-niobium, and cobalt-zirconium.

* * * * *